United States Patent
Nagamori (10) Patent No.: US 8,943,192 B2
(45) Date of Patent: Jan. 27, 2015

(54) DEVICE MANAGING APPARATUS, DEVICE MANAGING METHOD, AND COMPUTER-READABLE RECORDING MEDIUM FOR THE DEVICE MANAGING METHOD

(75) Inventor: Akira Nagamori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1098 days.

(21) Appl. No.: 12/549,672

(22) Filed: Aug. 28, 2009

(65) Prior Publication Data

US 2010/0057904 A1    Mar. 4, 2010

(30) Foreign Application Priority Data

Sep. 4, 2008   (JP) .................................. 2008-227285

(51) Int. Cl.
*G06F 15/173*   (2006.01)
*H04L 12/24*   (2006.01)

(52) U.S. Cl.
CPC .................................. *H04L 41/0273* (2013.01)
USPC ............ 709/224; 713/300; 713/320; 713/324

(58) Field of Classification Search
CPC .............. H04L 41/0273; H04W 52/00; H04W 52/0216; H04W 52/0258; H04W 52/265; H04W 84/18
USPC ......... 709/224; 710/15–19, 46, 109; 713/300, 713/320, 324
See application file for complete search history.

(56) References Cited

U.S. PATENT DOCUMENTS

| | | | | |
|---|---|---|---|---|
| 5,933,581 | A * | 8/1999 | Miyazaki et al. ............ | 358/1.14 |
| 6,463,307 | B1 * | 10/2002 | Larsson et al. ................ | 455/574 |
| 6,795,450 | B1 * | 9/2004 | Mills et al. ..................... | 370/463 |
| 6,879,410 | B1 * | 4/2005 | Tokura .......................... | 358/1.14 |
| 6,895,196 | B2 * | 5/2005 | Uchizono et al. ............... | 399/75 |
| 7,688,778 | B2 * | 3/2010 | Ogushi .......................... | 370/328 |
| 7,757,108 | B2 * | 7/2010 | Cheshire ....................... | 713/320 |
| 7,877,617 | B2 * | 1/2011 | Kaneda ......................... | 713/300 |
| 7,881,251 | B2 * | 2/2011 | Hovey ........................... | 370/328 |
| 2001/0041551 | A1 * | 11/2001 | Rotzoll .......................... | 455/343 |
| 2003/0004937 | A1 * | 1/2003 | Salmenkaita et al. ............ | 707/3 |
| 2003/0088796 | A1 * | 5/2003 | Abdulkarim .................. | 713/300 |
| 2003/0188019 | A1 * | 10/2003 | Wesley ......................... | 709/245 |
| 2004/0048589 | A1 * | 3/2004 | Yamamoto et al. ........... | 455/130 |
| 2004/0148434 | A1 * | 7/2004 | Matsubara et al. ........... | 709/246 |
| 2005/0234317 | A1 * | 10/2005 | Kiani ............................ | 600/323 |

(Continued)

FOREIGN PATENT DOCUMENTS

| | | |
|---|---|---|
| JP | 2001-066951 | 3/2001 |
| JP | 2004-133512 | 4/2004 |

(Continued)

*Primary Examiner* — David Lazaro
*Assistant Examiner* — Sarah Drabik
(74) *Attorney, Agent, or Firm* — IPUSA, PLLC (57) ABSTRACT

A device managing apparatus for monitoring and managing a device connected to a data transmission path includes an obtaining part configured to obtain power consumption status data from the device, the power consumption status data indicating a power consumption status of a communication unit included in the device, a selecting part configured to select a communication method according to the power consumption status data obtained from the obtaining part, and a communicating part configured to perform data communications with the device by using the communication method selected by the selecting part.

10 Claims, 9 Drawing Sheets

(56) References Cited

U.S. PATENT DOCUMENTS

| | | |
|---|---|---|
| 2006/0100724 A1 | 5/2006 | Miura et al. |
| 2006/0212730 A1* | 9/2006 | Senda .................. 713/300 |
| 2006/0270412 A1* | 11/2006 | Willins et al. ............. 455/445 |
| 2009/0248854 A1* | 10/2009 | Conway .................. 709/224 |
| 2009/0287855 A1* | 11/2009 | Nomura .................. 710/19 |

FOREIGN PATENT DOCUMENTS

| | | |
|---|---|---|
| JP | 2005-182701 | 7/2005 |
| JP | 2006-171297 | 6/2006 |
| JP | 2006-293983 | 10/2006 |
| JP | 2007-072626 | 3/2007 |

* cited by examiner

| OBTAINABLE DATA ITEM | COMMUNICATION METHOD | |
| --- | --- | --- |
| | SNMP | SOAP |
| TOTAL COUNTER | ◯ | ◯ |
| COPY COUNTER: FULL COLOR | ◯ | ◯ |
| COPY COUNTER: BLACK & WHITE | ◯ | ◯ |
| COPY COUNTER: MONOCHROME | ◯ | ◯ |
| COPY COUNTER: DICHROME | ◯ | ◯ |
| PRINTER COUNTER: FULL COLOR | ◯ | ◯ |
| PRINTER COUNTER: BLACK & WHITE | ◯ | ◯ |
| PRINTER COUNTER: MONOCHROME | ◯ | ◯ |
| PRINTER COUNTER: DICHROME | ◯ | ◯ |
| FAX PRINTING COUNTER: BLACK & WHITE | ◯ | ◯ |
| FAX PRINTING COUNTER: MONOCHROME | × | ◯ |
| A3/DLT COUNTER | × | ◯ |
| DOUBLE-SIDE COUNTER | × | ◯ |
| COVERAGE COUNTER: FULL COLOR (%) | × | ◯ |
| COVERAGE COUNTER: BLACK & WHITE (%) | × | ◯ |
| COVERAGE COUNTER: COLOR PRINTING PAGE | × | ◯ |
| COVERAGE COUNTER: BLACK & WHITE PRINTING PAGE | × | ◯ |
| GPC COUNTER | × | ◯ |
| GPC PRINTER COUNTER | × | ◯ |
| FULL COLOR GPC COUNTER | × | ◯ |
| A2 COUNTER | × | ◯ |
| TRANSMISSION TOTAL COUNTER: FULL COLOR | × | ◯ |
| TRANSMISSION TOTAL COUNTER: BLACK & WHITE | × | ◯ |
| FAX TRANSMISSION COUNTER | × | ◯ |
| SCANNER TRANSMISSION COUNTER: FULL COLOR | × | ◯ |
| SCANNER TRANSMISSION COUNTER: BLACK & WHITE | × | ◯ |
| ... | ... | ... |

DEVICE MANAGING APPARATUS, DEVICE MANAGING METHOD, AND COMPUTER-READABLE RECORDING MEDIUM FOR THE DEVICE MANAGING METHOD

BACKGROUND OF THE INVENTION

1. Field of the Invention

The present invention relates to a device managing apparatus, a device managing method, and a computer-readable recording medium for the device managing method.

2. Description of the Related Art

A system, which monitors the status of a device(s) such as an image processing apparatus (e.g., multifunction peripheral (MFP), printer) via a predetermined data path such as a network, is already known. With this system, a user can detect (know) an abnormality of plural devices that are being managed (target management devices) by a device managing apparatus without actually having to go and check the target management device from which the abnormality is detected (see, for example, Japanese Laid-Open Patent Application No. 2005-182701).

In monitoring the status of the device with this system, predetermined data communications (e.g., transmission/reception of status data) are performed between the target management devices and the device managing apparatus.

On the other hand, along with the advances in energy conservation, there are known image processing apparatuses having a communication unit that can shift to a power saving mode (status where power consumption is low (low power consumption status).

Various methods for reducing power consumption (power saving methods) are used by these image processing apparatuses (see., for example, Japanese Laid-Open Patent Application Nos. 2004-133512 and 2006-293983).

In a network system disclosed in Japanese Laid-Open Patent Application No. 2004-133512, status data of an image forming apparatus is transmitted from the image forming apparatus to a server in a case where there is a change in the status data (e.g., shift to power saving mode). Then, the server, receiving the status data from the image forming apparatus, responds to status inquiries from other devices as a substitute for the image forming apparatus that has shifted to the power saving mode. Thereby, even where the status of the image forming apparatus is a low power consumption status (power saving mode), responses to status inquiries from a network can be made with less energy consumption and less cost.

In Japanese Laid-Open Patent Application No. 2006-293983, a network communication apparatus disconnects connections with another communication apparatus during a power saving mode, sets its communication mode to a mode slower than its regular communication mode, and reestablishes (re-connects) connections with the other communication apparatus.

However, with the communication control methods disclosed in Japanese Laid-Open Patent Application Nos. 2005-182701, 2004-133512, and 2006-293983, there is a problem in which the target management devices undesirably shift from a power saving mode to a normal mode according to the communication method used for communicating between the devices.

For example, in a device management system that monitors the status of one or more target managing devices, status data are transmitted/received (data communications) between a device managing apparatus and a target management device. In a case where SNMP (Simple Network Management Protocol) is used to perform the data communications, a communication unit included in the target management device can maintain a low power consumption status, that is, the status of the target management device does not shift from the power saving mode to a normal mode. On the other hand, in a case where SOAP (Simple Object Access Protocol) is used to perform the data communications, the target management device being in the power saving mode is caused to return to the normal mode.

Therefore, even if the communication unit having a power saving mode is provided to the target management device, a power saving effect of the power saving mode cannot be satisfactorily achieved in a case where the device management system periodically performs polling of the status of the target management devices.

Although this problem could be relieved by making intervals of monitoring the status of the target management devices (intervals for performing polling) longer, more time would become required for detecting abnormality of the target management devices. Thus, the device management system would be unable to detect abnormality of the target management devices at an appropriate timing. This adversely affects the precision for monitoring the target management devices.

SUMMARY OF THE INVENTION

The present invention may provide a device managing apparatus, a device managing method, and a computer-readable recording medium for the device managing method that substantially eliminates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a device managing apparatus, a device managing method, and a computer-readable recording medium for the device managing method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a device managing apparatus for monitoring and managing a device connected to a data transmission path, the device managing apparatus including: an obtaining part configured to obtain power consumption status data from the device, the power consumption status data indicating a power consumption status of a communication unit included in the device; a selecting part configured to select a communication method according to the power consumption status data obtained from the obtaining part; and a communicating part configured to perform data communications with the device by using the communication method selected by the selecting part.

Another embodiment of the present invention provides a device managing method used for a device managing apparatus that monitors and manages a device connected to a data transmission path, the device managing method including the steps of: a) obtaining power consumption status data from the device, the power consumption status data indicating a power consumption status of a communication unit included in the device; b) selecting a communication method according to the power consumption status data obtained in step a); and c) performing data communications between the device managing apparatus and the device by using the communication method selected in step b).

Another embodiment of the present invention provides a computer-readable recording medium on which a program is recorded for causing a data managing apparatus to execute a data managing method used for a device managing system including the device managing apparatus for monitoring and managing a device connected to a data transmission path, the data managing method including the steps of: a) obtaining power consumption status data from the device, the power consumption status data indicating a power consumption status of a communication unit included in the device; b) selecting a communication method according to the power consumption status data obtained in step a); and c) performing data communications between the device managing apparatus and the device by using the communication method selected in step b).

Other objects, features and advantages of the present invention will become more apparent from the following detailed description when read in conjunction with the accompanying drawings.

DETAILED DESCRIPTION OF THE PREFERRED EMBODIMENTS (First Embodiment)
<System Configuration>

Figure 1:
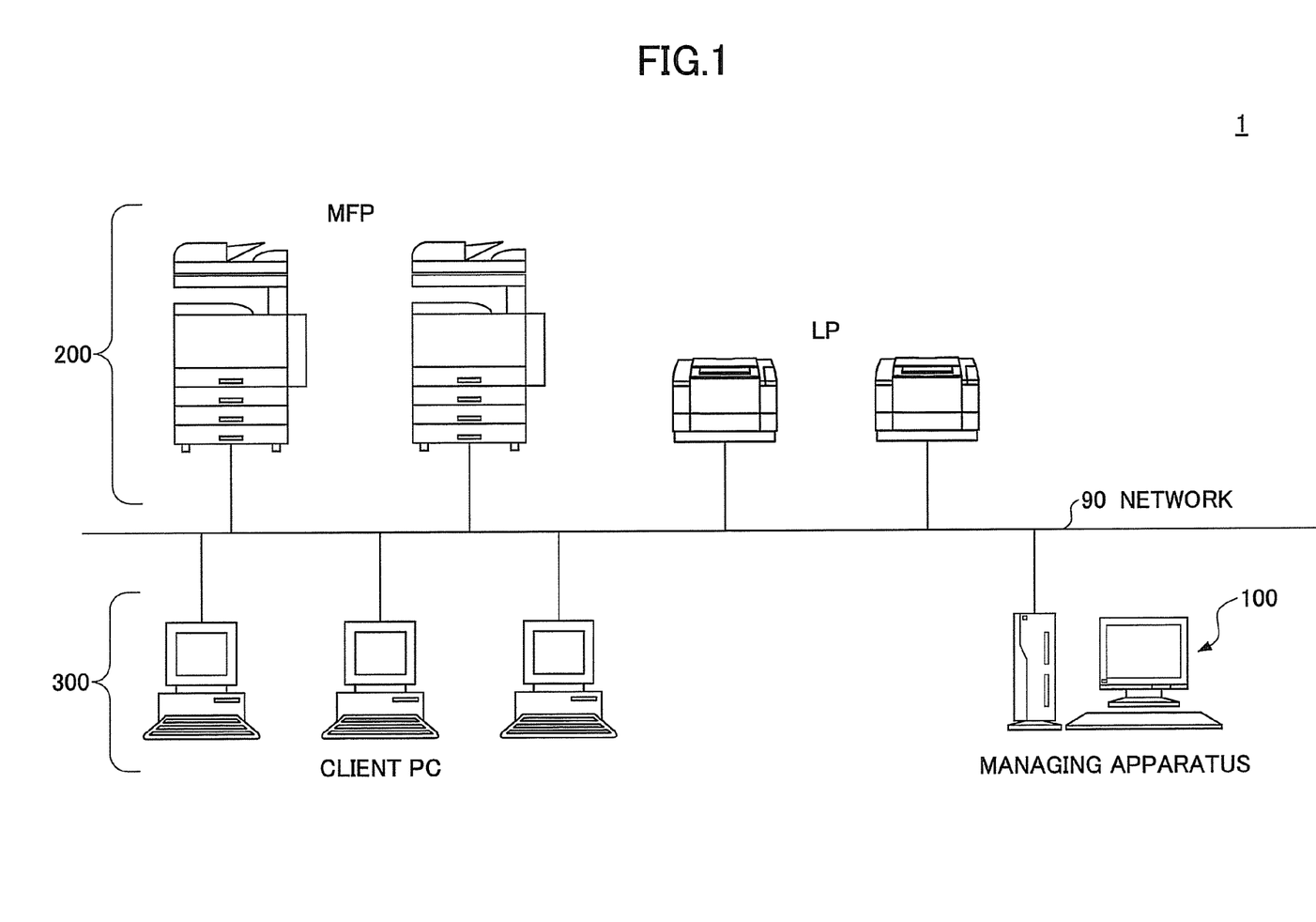
FIG. 1 is a schematic diagram illustrating a device management system according to an embodiment of the present invention.

A configuration of a device management system 1 according to an embodiment of the present invention is described. FIG. 1 is a schematic diagram illustrating a device management system 1 according to an embodiment of the present invention.

As illustrated in FIG. 1, the device management system 1 includes one or more target management devices 200 (e.g., Multi-Function Peripheral (MFP), Laser Printer (LP)), one or more client PCs (Personal Computer) 300, and a device managing apparatus 100 that are connected to each other by a data transmission path 90 (e.g., network).

In the device management system 1 having this configuration, the device managing apparatus 100 manages the target management devices 200, for example, by monitoring the status of the target management devices 200 and gathering data of the target management devices 200 (device managing function). Further, the device managing apparatus 100 provides various data regarding the statuses of the target management devices 200 to the client PCs 300.

In order to realize this data communications environment, the target management devices 200, the client PCs 300, and the device managing apparatus 100 each includes a communication unit CU that connects to the data transmission path 90. The communication unit CU is an interface device such as an NIC (Network Interface Card). Among the communication units CU included in the target management devices 200, client PCs 300, and the device managing apparatus 100, the communication unit CU included in the target management device 200 can shift from a normal mode to a power saving mode (electric power saving mode).

<Hardware Configuration>

Figure 2:
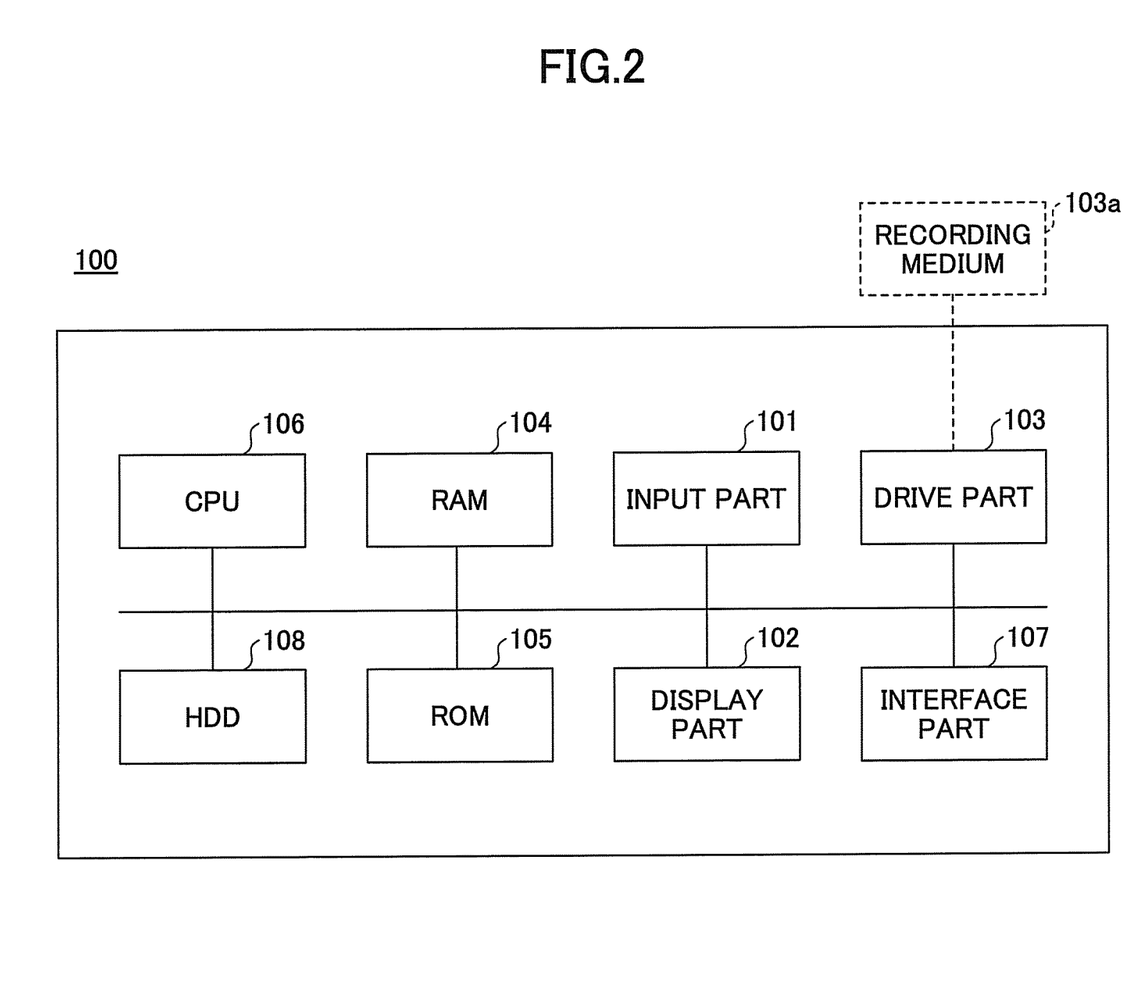
FIG. 2 is a schematic diagram illustrating a hardware configuration of a device managing apparatus according to an embodiment of the present invention.

Next, a hardware configuration of the device managing apparatus 100 according to an embodiment of the present invention is described. FIG. 2 is a schematic diagram illustrating the hardware configuration of the device managing apparatus 100 according to an embodiment of the present invention.

As illustrated in FIG. 2, the device managing apparatus 100 includes an input part 101, a display part 102, a drive part 103, a RAM 104 (Random Access Memory), a ROM (Read Only Memory) 105, a CPU (Central Processing Unit) 106, an interface part 107, and a HDD (Hard Disk Drive) 108 that are connected to each other by a bus.

The input part 101 includes, for example, a keyboard, a mouse, or both. The input part 101 is used to input control signals to the device managing apparatus 100. The display part 102 includes, for example, a display. The display part 102 is used to display results of processes (operations) performed by the device managing apparatus 100. For example, the display part 102 displays status data obtained from the target management devices 200 by the device managing apparatus 100.

The interface part 107 is an interface that connects the device managing apparatus 100 to the data transmission path (e.g., network) 90. The device managing apparatus 100 performs data communications between the target management device 200 and between the client PC 300 via the interface part 107.

The HDD 108 is a non-volatile storage device that stores various programs and data therein. For example, the programs and data stored in the HDD 108 may be used to control the entire device managing apparatus 100 and provide an OS (Operating System) such as Windows (registered Trademark) or UNIX (registered trademark). Further, the programs (e.g. application programs) and data (application data) stored in the HDD 108 may be used to provide various functions (e.g., device management function, data communication function) of the device managing apparatus 100. The HDD 108 manages the programs and data stored therein by using a predetermined file system or a database (DB).

The device managing apparatus 100 may obtain the above-described programs and data from a recording medium (e.g., CD (Compact Disk)) 103a. Further, the device managing apparatus 100 may download the above-described programs and data from the data transmission path 90 (e.g., network) via the interface part 107. In a case of obtaining the programs and data from the recording medium 103a, the data from the recording medium 103a is installed in the HDD 108 via the drive part 103 capable of reading various recording media.

The ROM 105 is a non-volatile semiconductor memory (storage device) that can retain stored data even when not powered. Various data are stored in the ROM 105 such as data related to the BIOS (Basic Input/Output System) for activating the device managing apparatus 100, data related to the settings of the system 1 of the device managing apparatus 100, and data related to settings of the network 90.

The RAM 104 is a volatile semiconductor memory (storage device) that can temporarily store programs and data read out from various storage devices. The CPU 106 controls the entire device managing apparatus 100 and performs each function of the device managing apparatus 100 by executing the programs stored in RAM 104.

With the above-described hardware configuration of the device managing apparatus 100, a program for performing a device management function is read from the HDD 108, temporarily stored in the RAM 104, and executed by the CPU 106. Thereby, the device managing apparatus 100 can monitor the status of the target management devices 200, gather various data, and provide data to the client PCs 300.

<Communication Control Function>

The device managing apparatus 100 manages the target management device(s) 200 by performing the device management function. The device management function includes obtaining status data from the target management device 200, updating device data stored therein according to the obtained status data, and monitoring the status of the target management device 200. The "status data" includes data indicating the status of the target management device 200 (e g., Management Information Base data). The "device data" includes various data related to the target management device 200.

The device management function also includes a communication control function used for controlling the transmission/reception of various data (e.g., status data) between the target management device 200. The communication control function is described in further detail below.

In a related art example where a polling process is periodically performed on a target management device (i.e. periodically obtaining status data of the target management device), communications are performed using a predetermined communication method without taking into consideration the status of a power consumption mode of a communication unit included in the target management device. Therefore, even in a case where the communication unit is in a low power consumption mode, the power consumption mode of the communication unit shifts (returns) from the low power consumption mode to a normal standby mode whenever the target management device receives a request to obtain status data. As a result, the communication unit of the target management device is unable to continue maintaining the low power consumption mode. In other words, the device managing apparatus of the related art example does not use a suitable communication method in accordance with the power consumption mode of the communication unit of the target management device Therefore, the communication control function of the device managing apparatus of the related art example is unable to reduce power consumption under a condition where target management devices are periodically monitored by performing communications between the device managing apparatus and the target management devices.

Accordingly, in a case where there are many target management devices in a device management system or where data communications are frequently performed between the device managing apparatus and the target management device(s), power is wasted by communications performed during a monitoring operation. This results in a decrease in the performance of power consumption efficiency of the entire device management system of the related art example.

Therefore, the embodiment of the present invention focuses on the relationship between the power consumption mode and the communication method of the communication unit CU of the target management device 200. Among various communication methods, there are communication methods that allow the communication unit CU of the target management device 200 to perform data communications (transmission/reception of data) while maintaining a low power consumption status (low power consumption mode). An example of this communication method is SNMP.

Accordingly, in order to solve the above-described problem of power consumption efficiency, the device managing apparatus 100 according to an embodiment of the present invention is desired to obtain status data of the target management device 200 while allowing the communication unit CU of the target management device 200 to maintain a low power consumption status.

In a case where SNMP is used, there are restrictions on data that can be obtained (obtainable data) compared to other communication methods (e.g., SOAP). Nevertheless, obtaining status data of the target management device 200 is possible.

The device managing apparatus 100 according to an embodiment of the present invention obtains power consumption status data from the communication unit CU of the target management device 200 and selects a suitable communication method from plural communication methods (supported communication methods) that can be used to communicate with the target management device 200 according to the obtained power consumption status data. The "power consumption status data" includes data related to the status of the power consumption of the communication unit CU of the target management device 200. Then, the device managing apparatus 100 uses the selected communication method to communicate with the target management device 200.

In other words, the device managing apparatus 100 according to an embodiment of the present invention selects a suitable communication method according to the power consumption mode of the communication unit CU of the target management device 200 and uses the selected communication method to monitor the status of the target management device.

Accordingly, the device managing apparatus 100 according to an embodiment of the present invention can monitor the status of the target management device 200 while allowing the communication unit CU of the target management device 200 to maintain a low power consumption status. Because the power consumption mode of the communication unit CU of the target management device 200 does not shift from a power saving mode to a normal mode during the process of obtaining status data from the target management device 200, power consumption can be reduced and the performance of power consumption efficiency of the entire device management system 1 can be improved even under a condition where the target management device 200 is periodically monitored by communicating with the device managing apparatus 100.

Next, function parts and processes of the communication control function of the device managing apparatus 100 according to an embodiment of the present invention are described. In the below described embodiment, the communication methods that can be used for the communications between the device managing apparatus 100 and the target management device 200 are SNMP and SOAP. SOAP is merely an example of a communication method other than SNMP. Thus, other communication methods besides SOAP may also be used in the embodiment of the present invention.

Figure 3:
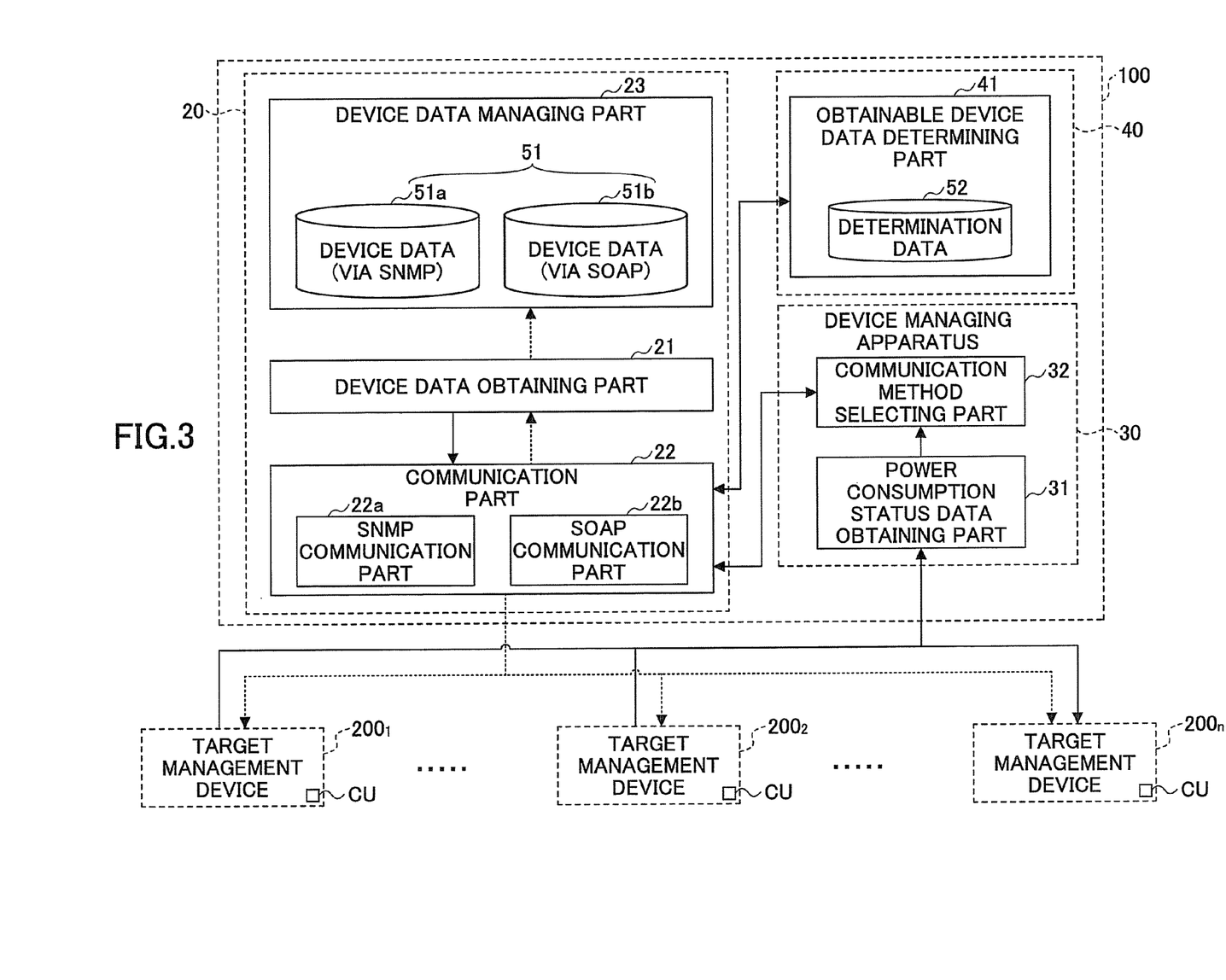
FIG. 3 is a schematic diagram illustrating function parts of a communication control function of a device managing apparatus according to an embodiment of the present invention.

FIG. 3 is a schematic diagram illustrating function parts of the communication control function of the device managing apparatus 100 according to an embodiment of the present invention.

The communication control function in this embodiment is mainly constituted of software components (function parts) related to a communication control function of a device management component (application) installed in the device managing apparatus 100.

As illustrated in FIG. 3, the communication control function of the device managing apparatus 100 according to an embodiment of the present invention has first-third function groups. The first function group 20 is for obtaining device data 51 from the target management device(s) 200 and managing the device data 51 in correspondence with the communication method used when obtaining the device data 51 from the target management device 200. The device data 51 includes status data of the target management device 200 (i.e. data indicating the status of the target management device 200). The second function group 30 is for obtaining power consumption status data from the target management device(s) 200 and selecting a communication method according to the obtained power consumption status data. The power consumption status data includes status data of power consumption of the communication unit CU of the target management device 200 (data indicating the status of power consumption of the target management device 200). The third function group 40 is for determining data items of the device data 51 that can be obtained from the target management device 200 according to the communication method selected by the second function group 30.

(First Function Group)

The first function group 20 includes a device data obtaining part 21, a communication part 22, and a device data managing part 23.

The device data obtaining part 21 obtains device data 51 from the target management device 200 via the data transmission path 90 (e.g., network). The device data obtaining part 21 obtains the device data 51 by performing a polling process in accordance with a predetermined monitoring interval (operation timing). The device data obtaining part 21 obtains the device data 51 from the target management device 200 via the communication part 22.

The communication part 22 performs data communications with the target management device 200 by using a predetermined communication method. The communication part 22 includes communication function parts corresponding to the communication methods that can be used for communicating with the target management device 200. That is, communication function parts corresponding to the communication methods supported by the device managing apparatus 100 are included in the communication part 22. In this embodiment, the communication part 22 includes an SNMP communication part 22a and a SOAP communication part 22b. In a case where data communications are performed using SOAP, the communication part 22 uses the SOAP communication part 22b. In a case where data communications are performed using SNMP, the communication part 22 uses the SNMP communication part 22a. Accordingly, the communication part 22 performs data communications with the target management device 200 by switching the use (control) of the SNMP communication part 22a and the SOAP communication part 22b according to the communication method selected by the second function part 30.

The device data managing part 23 maintains the device data 51 (51a, 51b) obtained by the device data obtaining part 21 and manages the maintained device data 51 (51a, 51b) in correspondence with each communication method used in obtaining the device data 51 (51a, 51b). For example, in a case where the device data 51 is obtained by using SNMP as the communication method, the device data 51 is managed as device data 51a obtained via SNMP. In a case where the device data 51 is obtained by using SOAP as the communication method, the device data 51 is managed as device data 51b obtained via SOAP. Because the data that can be obtained from each target management device 200 (obtainable data) differ depending on the type of communication method, the device data 51 are managed in correspondence with each communication method. This facilitates management of the device data 51 because the communication method which was used to obtain the device data 51 can easily be determined. The device data managing part 23 stores the device data 51 in a storage device (e.g., HDD 108) of the device managing apparatus 100 and manages the stored device data 51.

(Second Function Group)

The second group 30 includes a power consumption status data obtaining part 31 and a communication method determining part 32.

The power consumption status data obtaining part 31 obtains status data of power consumption (e.g., data indicating low power consumption mode and data indicating normal power consumption mode) from the communication unit CU of the target management device 200 via the data transmission path 90 (e.g., network).

The communication method selecting part 32 selects a communication method from plural communication methods that can be used in communicating with the target management device 200 according to the power consumption status data obtained by the power consumption status data obtaining part 31.

[Selection of Communication Method]

In selecting the communication method, first, the communication method selecting part 32 determines the power consumption status of the communication unit CU of the target management device 200 by referring to the power consumption status data obtained from the power consumption status data obtaining part 31. In this embodiment, the communication mode selecting part 32 determines whether the status of the communication unit CU of the target management device 200 is a low power consumption mode.

Then, the communication method selecting part 32 selects either SNMP or SOAP (communication method that can be used in communicating with the target management device 200) according to the determined power consumption status (e.g., result of determining whether the status of the target management device 200 is a low power consumption mode).

In a case where the communication method selecting part 32 determines that the communication unit CU of the target management device 200 is in a low power consumption status, the communication method selecting part 32 selects SNMP so that data communications can be performed while maintaining the low power consumption status. On the other hand, in a case where the communication method selecting part 32 determines that the communication unit CU of the target management device 200 is not in a low power consumption status, the communication method selecting part 32 selects a communication method other than SNMP (in this embodiment, SOAP).

Accordingly, the communication method selecting part 32 can select a suitable communication method enabling reduction of power consumption during data communications according to the power consumption mode of the communication unit CU of the target management device 200. Thereby, the communication part 22 performs data communications with the target management device 200 by using either the SNMP communication part 22a or the SOAP communication part 22b according to the selected communication method.

The power consumption status data may be data capable of being transmitted/received by the communication unit CU of the target management device 200 and capable of being determined whether it indicates a low power consumption status. For example, the power consumption status data may be a power saving mode set in the target management device 200.
(Third Function Group)

The third function group 40 includes an obtainable device data determining part 41. The obtainable device data determining part 41 determines data items of the device data 51 that can be obtained from the target management device 200 according to the communication method selected by the second function group 30.
[Determination of Obtainable Device Data]

The obtainable device data determining part 41 determines the data item(s) of the device data 51 that can be obtained from the target management device 200 by referring to determination data 52 (see, for example, FIG. 4) according to the selected communication method. The determination data 52 are maintained in the obtainable device data determining part 41.

Figure 4:
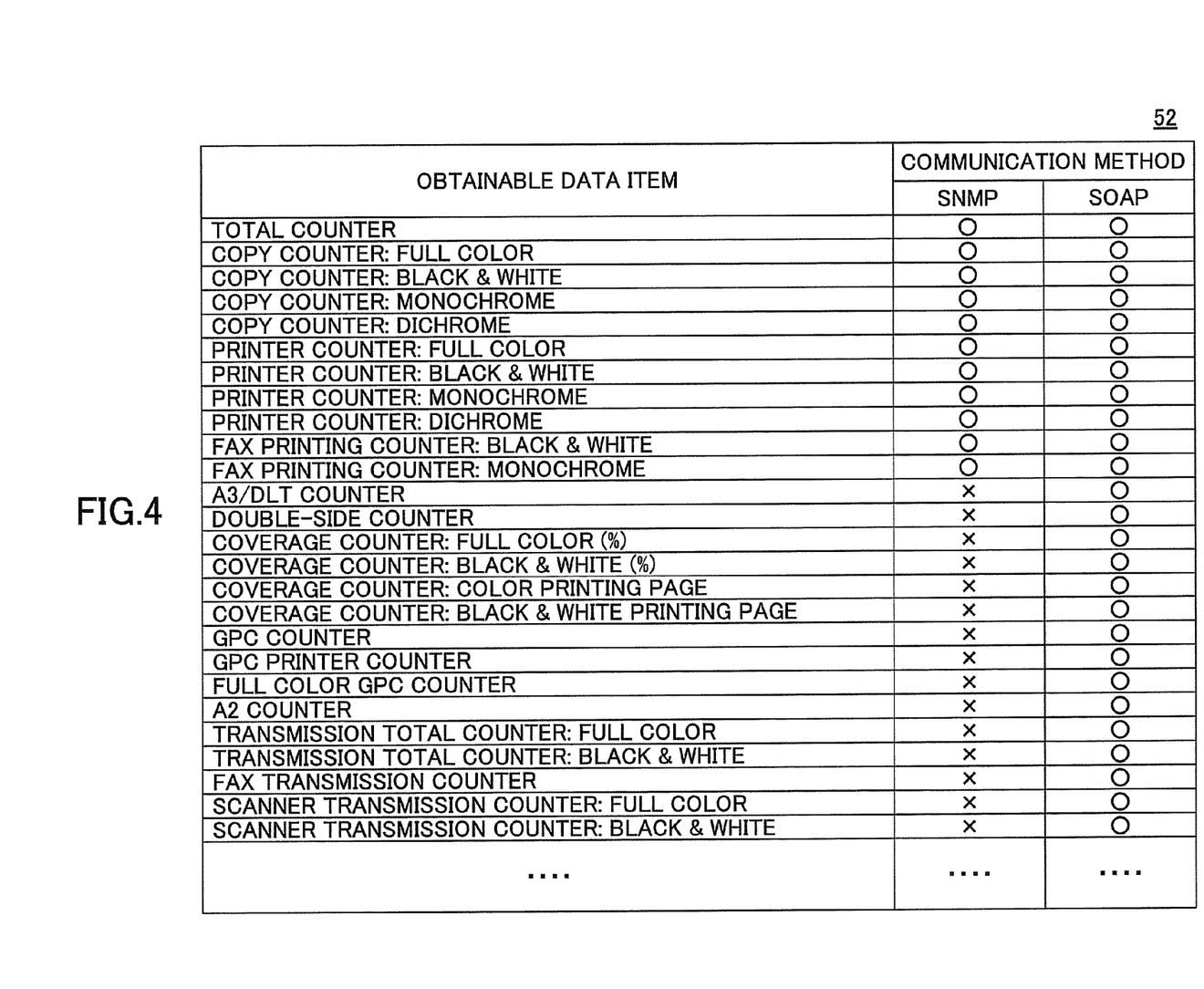
FIG. 4 is a schematic diagram illustrating an exemplary configuration of determination data used for determining device data that can be obtained from a target management device according to an embodiment of the present invention.

FIG. 4 is a schematic diagram illustrating an exemplary configuration of determination data 52 used for determining device data 51 that can be obtained from the target management device 200 according to an embodiment of the present invention. As illustrated in FIG. 4, the determination data 52 indicates data items of the device data 51 in correspondence with data indicating whether a corresponding data item is obtainable with respect to each communication method.

For example, as illustrated in the determination data 52 of FIG. 4, the obtainable device data determining part 41 determines that data items "total counter" through "fax printing counter: monochrome" can be obtained as device data 51 from the target management device 200 (obtainable device data) in a case where SNMP is selected as the communication method.

On the other hand, in a case where SOAP is selected as the communication method, data item "A3/DLT counter" and data items following the data item "A3/DLT counter" are determined as obtainable data in addition to data items determined as obtainable data in the case where SNMP is used.

Accordingly, in a case of obtaining the device data 51 from the target management device 200 using the selected communication method, the obtainable device data determining part 41 identifies (designates) the data item(s) to be obtained as the device data 51. Thereby, the communication part 22 obtains device data 51 from the target management device 200 according to the data items identified by the obtainable device data determining part 41.

Although the above-described embodiment has the determination data 52 included in the obtainable device data determining part 41, the determination data 52 may be provided, for example, as an outside file that is installed in a storage device outside the obtainable device data determining part 41. In this case, determination of obtainable device data is performed by referring to the determination data 52 based on data indicating the location in which the determination data 52 are stored (e.g., file path or address).
<Processes of Communication Control Function of the Device Managing Apparatus>

The communication control function of the device managing apparatus 100 is achieved by cooperatively operating the above-described function parts (software components) of the device managing apparatus 100. In this embodiment, the CPU 106 reads out data corresponding to the function parts of the device managing apparatus 100 from the ROM 105, stores the read out data to the RAM 104, and executes the below-described processes.
(Communication Control Process)

Figure 5:
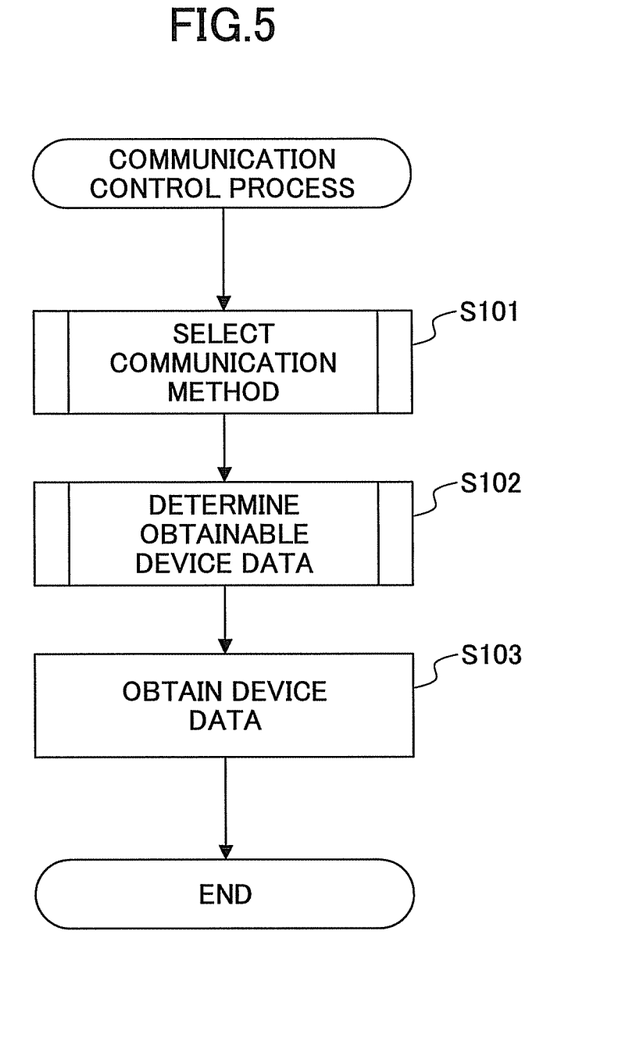
FIG. 5 illustrates a flowchart of steps (processes) of a communication control process according to an embodiment of the present invention.

FIG. 5 illustrates a flowchart of steps (processes) of a communication control process according to an embodiment of the present invention.

With reference to FIG. 5, in the device managing apparatus 100, the second function group 30 selects the communication method to be used in performing data communications with the target management device 200 (Step S101).

Then, the second function group 40 determines the data item(s) of the device data 51 that can be obtained from the target management device 200 based on the communication method selected in Step S101 (Step S102).

Accordingly, the first function part 20 initiates data communications with the target management device 200 by using the selected communication method selected in Step S101 and obtains the data items of the device data 51 determined in Step S102 (Step S103).
(Communication Method Selecting Process)

Figure 6:
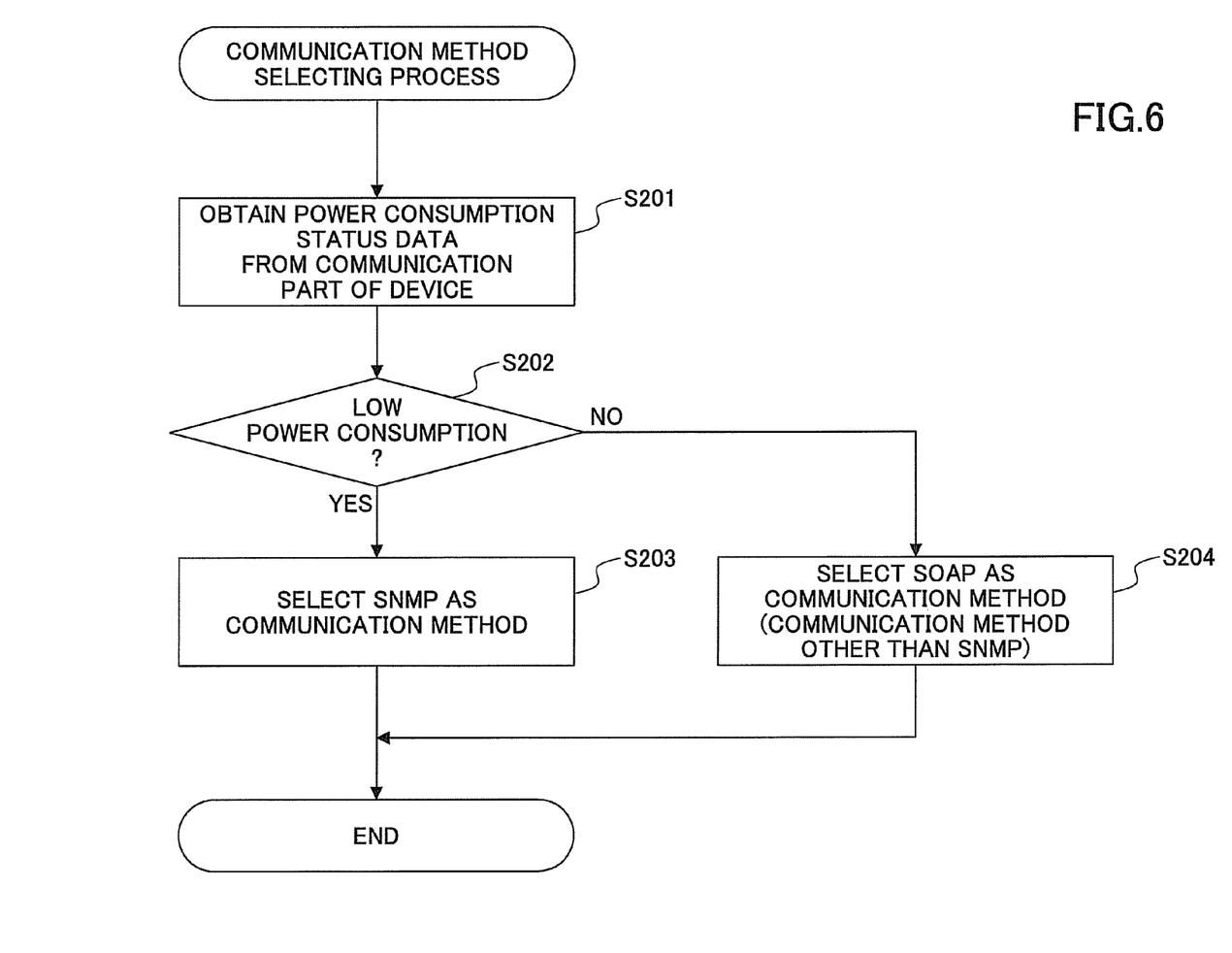
FIG. 6 illustrates a flowchart of steps (processes) of a communication method selecting process according to an embodiment of the present invention.

Next, a communication method selecting process of the above-described Step S102 is described. FIG. 6 illustrates a flowchart of steps (processes) of a communication method selecting process according to an embodiment of the present invention.

With reference to FIG. 6, in the device managing apparatus 100, the power consumption status data obtaining part 31 obtains power consumption status data from the communication unit CU of the target management device 200 (Step S201).

Then, the communication method selecting part 32, receiving the obtained power consumption status data from the power consumption status data obtaining part 31, determines whether the power consumption status of the communication unit CU of the target management device 200 is a low power consumption status (Step S202).

In a case where the communication method selecting part 32 determines that the power consumption status of the communication unit CU is a low power consumption status (YES in Step S202), the communication method selecting part 32 selects the communication method (in this embodiment, SNMP) that enables data communications to be performed while maintaining the low power consumption status of the communication unit CU (Step S203).

On the other hand, in a case where the communication method selecting part 32 determines that the power consumption status of the communication unit CU is not in a low power consumption status such as a normal standby status (NO in Step S202), the communication method selecting part 32 selects a communication method other than SNMP (in this embodiment, SOAP) (Step S204).
(Obtainable Data Determining Process)

Figure 7:
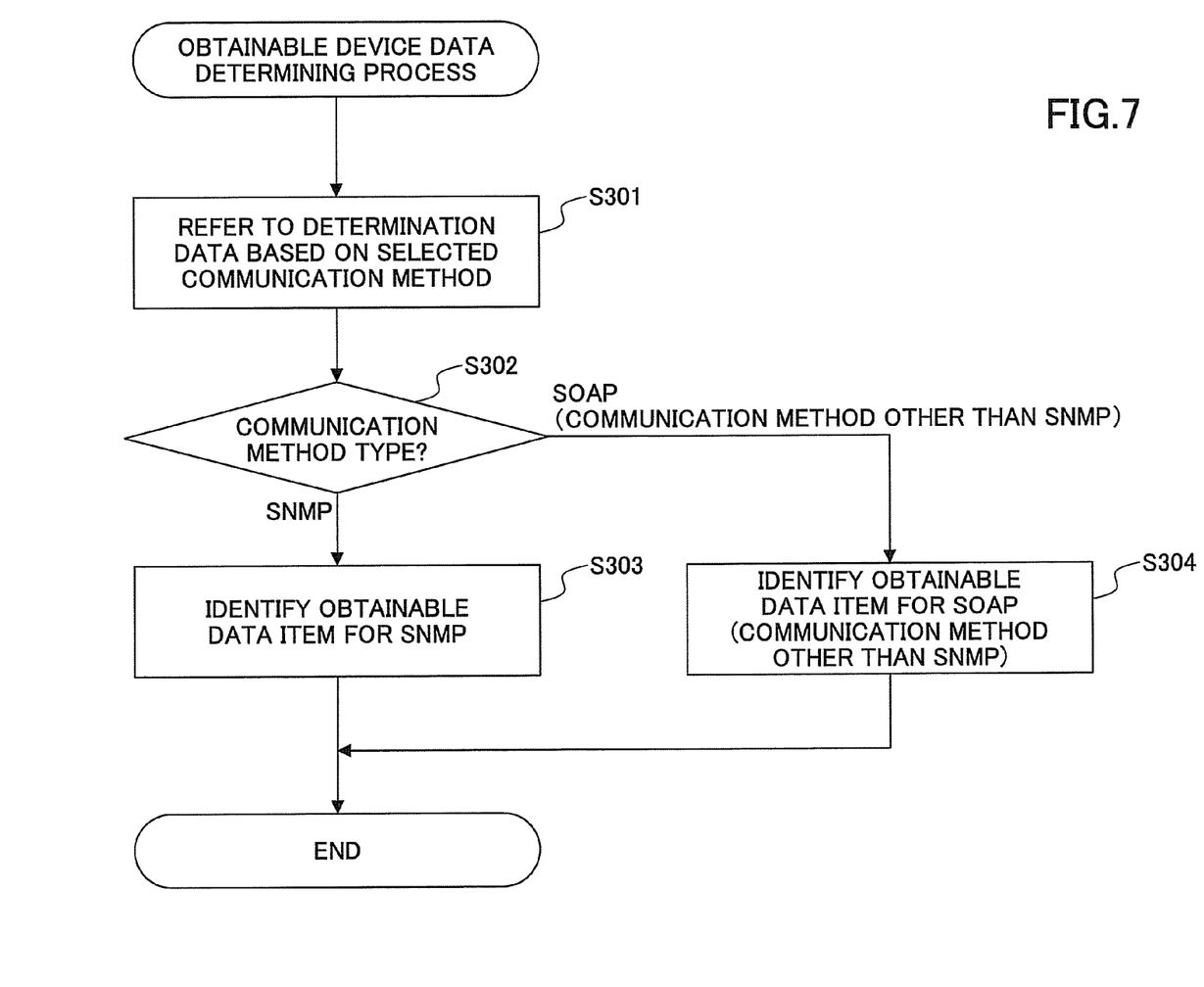
FIG. 7 illustrates a flowchart of steps (processes) of an obtainable data determining process according to an embodiment of the present invention.

Next, an obtainable data determining process of the above-described Step S103 is described. FIG. 7 illustrates a flowchart of steps (processes) of an obtainable data determining process according to an embodiment of the present invention.

With reference to FIG. 7, in the device managing apparatus 100, the obtainable device data determining part 41 refers to the determination data 52 based on the selected communication method (Step S301) and determines the data item(s) of the device data 51 that can be obtained from the target management device 200 (Step S302).

Then, in a case where SNMP is selected as the communication method in Step S302, the obtainable device data determining part 41 identifies the data item(s) that can be obtained as the device data 51 when performing data communication with the target management device 200 using SNMP (Step S303).

On the other hand, in a case where SOAP is selected as the communication method in Step S302, the obtainable device data determining part 41 identifies the data item(s) that can be obtained as the device data 51 when performing data communication with the target management device 200 using SOAP (Step S304).

Accordingly, with the device managing apparatus 100 according to the above-described embodiment of the present invention in which the processes of the function parts (software components) are executed by the CPU 106, a suitable communication method corresponding to the power consumption status of the communication unit CU of the target management device 200 can be selected for enabling reduction of power consumption. Further, data communications can be controlled so that only obtainable data items of the device data 51 are transmitted/received between the target management device 200 when performing data communications using the selected communication method.

<Modified Example of Device Managing System>

Although the above-described embodiment describes a configuration of a system 1 having a device managing apparatus 100 including the first function part 20 having a device data obtaining function and a device monitoring function, the second function part 30 having a power consumption status data obtaining function and a communication method selecting function, and the third function part 40 having an obtainable device data determining function, the system 1 is not limited to such a configuration.

Figure 8:
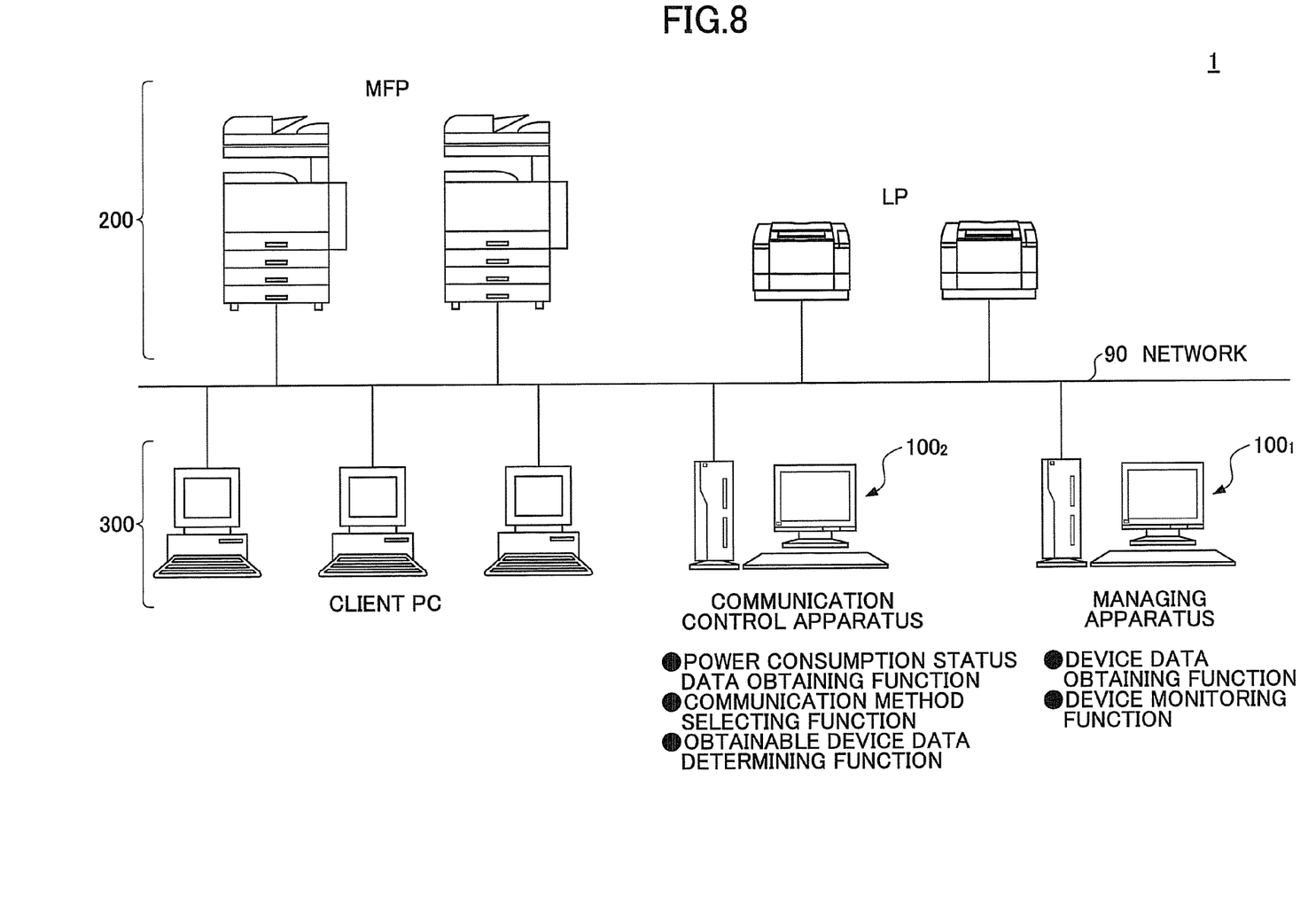
FIG. 8 is a schematic diagram for describing a modified example of a device managing system according to an embodiment of the present invention.
Figure 9:
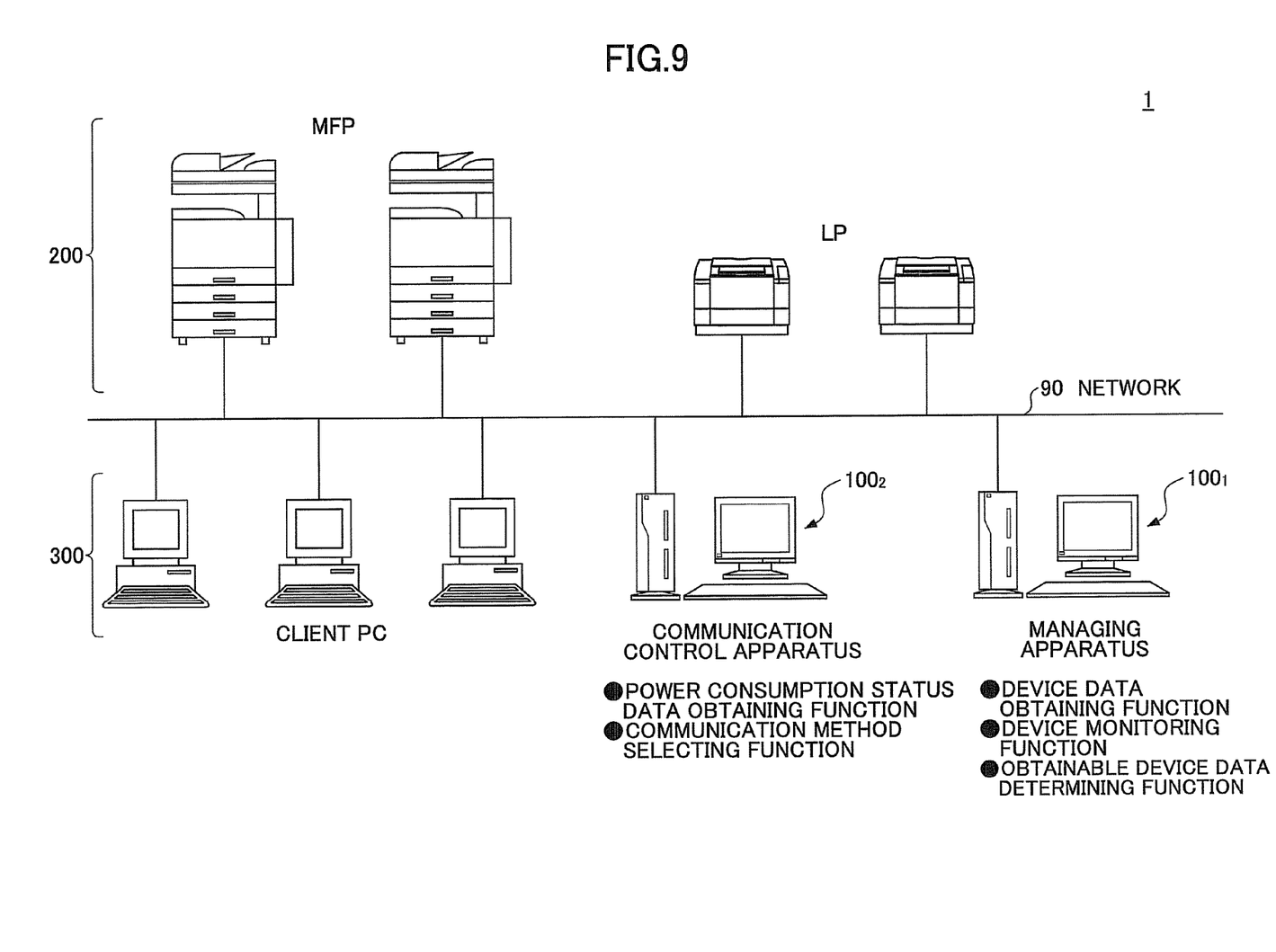
FIG. 9 is a schematic diagram for describing another modified example of a device managing system according to an embodiment of the present invention.

The system may have the below-described configuration as illustrated in FIGS. 8 and 9.

FIGS. 8 and 9 are schematic diagrams for describing modified examples of a device managing system 1 of the present invention.

As illustrated in FIG. 8, this embodiment of the device managing system 1 has a device managing apparatus $100_1$ provided with only the first function part 20 having a device data obtaining function and a device monitoring function whereas a data processing apparatus (in FIG. 8, communication control apparatus) $100_2$ other than the device managing apparatus $100_1$ includes the second function part 30 having a power consumption status data obtaining function and a communication method selecting function, and the third function part 40 having an obtainable device data determining function.

Because the device managing function and the communication control function of the device managing system can be provided by separate apparatuses, the workload of the device managing system 1 can be decentralized.

Alternatively, as illustrated in FIG. 9, this embodiment of the device managing system 1 has a device managing apparatus $100_1$ provided with the first function part 20 having a device data obtaining function and a device monitoring function and the third function part 40 having an obtainable device data determining function whereas a data processing apparatus (in FIG. 9, communication control apparatus) $100_2$ other than the device managing apparatus $100_1$ includes the second function part 30 having a power consumption status data obtaining function and a communication method selecting function.

Because the device managing function and the communication control function of the device managing system can be provided by separate apparatuses, the workload of the device managing system 1 can be decentralized. Further, maintenance and operation can be facilitated because the obtaining of device data 51 is performed only with a single apparatus having a function for determining the data item(s) of the device data 51 that can be obtained from the target management device 200.

<Overview>

With the above-described embodiments of the present invention, the device managing apparatus 100 can obtain power consumption status data (data regarding status of power consumption of the communication unit CU included in target management device 200), determine the power consumption status of the target management device 200, and select a suitable communication method from plural communication methods that can be used in performing data communications between the device managing apparatus 100 and the target management device 200 according to the determined power consumption status of the target management device 200.

In a case where the power consumption status is a "low power consumption status", SNMP (capable of maintaining the low power consumption status for the communication unit CU) is selected as the communication method used in performing data communications between the device managing apparatus 100 and the target management device 200.

Thus, the device managing apparatus 100 can select (switch) a suitable communication method according to the power consumption mode of the communication unit CU included in the target management device 200 and perform data communications with the target management device 200 while maintaining a low power consumption status of the communication unit CU.

Because the power consumption mode of the communication unit CU of the target management device 200 does not shift from a power saving mode to a normal mode during the process of obtaining status data from the target management device 200, power consumption can be reduced even under a condition where the target management device 200 is periodically monitored by communicating with the device managing apparatus 100.

Accordingly, with the above-described embodiments of the device managing apparatus 100, power can be prevented from being wasted whenever a monitoring process is performed with respect to the target management device 200. Thus, the performance of power consumption efficiency of the entire device managing system 1 can be improved.

In the above-described embodiments of the device managing apparatus 100, the communication control function including various processes is encoded as a program programmed by a programming language adaptable to the operating environment (platform) hardware for enabling the CPU 106 to execute the program. Accordingly, the program can be stored (recorded) in a computer-readable recording medium 103a.

By storing (recording) the program onto the computer-readable recording medium (e.g., floppy disk (registered trademark), CD (Compact Disk), DVD (Digital Versatile Disk)) 103a and loading the computer-readable recording medium 103a to the media readable drive part 103, the program can be installed in the device managing apparatus 100. Further, because the device managing apparatus 100 includes the interface part 107, the program may be downloaded from the Internet via a data transmission line (telecommunication lines) 90 and installed into the device managing apparatus 100.

In the above-described embodiments of the device managing apparatus 100, although the device data 51 are stored in a storage device (e.g. HDD 108) inside the device managing apparatus 100 and managed by the device data managing part 23, the device data 51 may be stored in other storage devices.

For example, the device data 51 may be stored in the computer-readable recording medium 103a or an outside storage device connected to the device managing apparatus 100 via the data transmission path 90 as long as the device data managing part 23 can control (manage) the device data 51.

The present invention is not limited to the specifically disclosed embodiments, and variations and modifications may be made without departing from the scope of the present invention.

The present application is based on Japanese Priority Application No. 2008-227285 filed Sep. 4, 2008, the entire contents of which are hereby incorporated herein by reference.

What is claimed is:

1. A device managing apparatus including a Central Processing Unit (CPU) and a memory for managing a device connected to a network, the device managing apparatus comprising:
    an obtaining part, responsive to the CPU and the memory, configured to obtain power consumption status data from the device via the network, the power consumption status data indicating a power consumption status of the device;
    a selecting part, responsive to the CPU and the memory, configured to select a communication protocol from a plurality of communication protocols according to the power consumption status data obtained from the obtaining part; and
    a communicating part, responsive to the CPU and the memory, configured to communicate with the device via the network by using the communication protocol selected by the selecting part; and
    a determining part, responsive to the CPU and the memory, including determination data indicating whether one or more data items regarding the device are obtainable with respect to each of the plurality of communication protocols and configured to determine whether the one or more data items regarding the device are obtainable from the device according to the determination data;
    wherein the one or more data items regarding the device include data pertaining to an image processing of a monochrome or color image.

2. The device managing apparatus as claimed in claim 1, wherein the selecting part, responsive to the CPU and the memory, is Confligured to select a first communication protocol or a second communication protocol from the plurality of communication protocols,
    wherein the first communication protocol can be used by the device even in a case where the device is in a low power consumption status.

3. The device managing apparatus as claimed in claim 2, wherein the selecting part, responsive to the CPU and the memory, is configured to determine whether the device is in the low power consumption status.

4. The device managing apparatus as claimed in claim 3, wherein the selecting part, responsive to the CPU and the memory, is configured to select Simple Network Management Protocol (SNMP) as the first communication protocol when the selecting part determines that the device is in the low power consumption status.

5. The device managing apparatus as claimed in claim 3, wherein the selecting part, responsive to the CPU and the memory, is configured to select Simple Object Access Protocol (SOAP) as the second communication protocol when the selecting part determines that the device is in the low power consumption status.

6. The device managing apparatus as claimed in claim 3,
    wherein the selecting part, responsive to the CPU and the memory, is configured to switch the communication protocol used by the communicating part according to the power consumption status data obtained from the obtaining part,
    wherein in a case where the communicating part is communicating with the device by using the second communication protocol, the selecting part, responsive to the CPU and the memory, is configured to switch the communication protocol used by the communicating part from the second communication protocol to the first communication protocol when the selecting part determines that the device is in the low power consumption status.

7. The device managing apparatus as claimed in claim 1, wherein the obtaining part, responsive to the CPU and the memory, is configured to obtain the power consumption status data from the device via the network by using the communication protocol selected by the selecting part.

8. The device managing apparatus as claimed in claim 1, further comprising:
    a device data obtaining part, responsive to the CPU and the memory, configured to obtain device data from the device according to the one or more data items determined to be obtainable by the determining part.

9. A non-transitory computer-readable recording medium on which a program is recorded for causing a device managing apparatus to execute a method used for a device managing system including the device managing apparatus for managing a device connected to a network, the method comprising the steps of:
    a) obtaining power consumption status data from the device via the network, the power consumption status data indicating a power consumption status of the device;
    b) selecting a communication protocol from a plurality of communication protocols according to the power consumption status data obtained in the step a); and
    c) communicating with the device via the network by using the communication protocol selected in the step b);
    d) storing determination data indicating whether one or more data items regarding the device are obtainable with respect to each of the plurality of communication protocols; and
    e) determining whether the one or more data items regarding the device are obtainable from the device according to the determination data;
    wherein the one or more data items regarding the device include data pertaining to an image processing of a monochrome or color image.

10. A device managing method used for a device managing apparatus that manages a device connected to a network, the device managing method comprising the steps of:

a) obtaining power consumption status data from the device via the network, the power consumption status data indicating a power consumption status of the device;
b) selecting a communication protocol from a plurality of communication protocols according to the power consumption status data obtained in the step a);
c) communicating with the device via the network by using the communication protocol selected in the step b);
d) storing determination data indicating whether one or more data items regarding the device are obtainable with respect to each of the plurality of communication protocols; and
e) determining whether the one or more data items regarding the device are obtainable from the device according to the determination data;
wherein the one or more data items regarding the device include data pertaining to an image processing of a monochrome or color image.

\* \* \* \* \*